US007539819B1

(12) United States Patent
Moll

(10) Patent No.: US 7,539,819 B1
(45) Date of Patent: May 26, 2009

(54) CACHE OPERATIONS WITH HIERARCHY CONTROL

(75) Inventor: Laurent R. Moll, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 330 days.

(21) Appl. No.: 11/543,598

(22) Filed: Oct. 4, 2006

Related U.S. Application Data

(60) Provisional application No. 60/731,784, filed on Oct. 31, 2005.

(51) Int. Cl.
  *G06F 12/00* (2006.01)
(52) U.S. Cl. ........................... 711/122; 711/119
(58) Field of Classification Search ............. 711/122
  See application file for complete search history.

(56) References Cited

U.S. PATENT DOCUMENTS 5,285,323 A * 2/1994 Hetherington et al. ...... 711/122
5,895,487 A * 4/1999 Boyd et al. .................. 711/122
6,085,293 A * 7/2000 Carpenter et al. ........... 711/141
6,314,500 B1 * 11/2001 Rose .......................... 711/148
7,047,365 B2 * 5/2006 Kunkel et al. ............... 711/141
2003/0188129 A1 * 10/2003 Henry et al. ................ 712/209
2004/0059875 A1 * 3/2004 Garg et al. .................. 711/141

* cited by examiner

*Primary Examiner*—Kevin L Ellis
*Assistant Examiner*—Hashem Farrokh
(74) *Attorney, Agent, or Firm*—Osha • Liang LLP

(57) ABSTRACT

An improved approach to cache management is disclosed which may be implemented to provide fine-grained control over individual caches or subsets of a multi-level cache hierarchy. By selectively operating on shared and unshared caches during power management processing, more efficient system operation can be achieved. In one example, a microprocessor is adapted to interface with multiple caches configured in multiple cache levels. The microprocessor includes multiple processors associated with the caches. At least one of the processors is adapted to execute an instruction configured to identify a subset of the caches. The microprocessor also includes a control circuit adapted to perform an operation on the subset of the caches in response to an execution of the instruction by the at least one of the processors.

28 Claims, 3 Drawing Sheets

US 7,539,819 B1

CACHE OPERATIONS WITH HIERARCHY CONTROL

CROSS-REFERENCE TO RELATED APPLICATIONS

This application claims the benefit of U.S. Provisional Patent Application No. 60/731,784 filed on Oct. 31, 2005 and entitled "Extended cache operations to provide control over which levels of the hierarchy they apply to" which is incorporated herein by reference.

BACKGROUND

Caches are frequently implemented in various computer architectures to facilitate rapid access to frequently-used data. Such architectures typically support cache operation instructions to manage the caches. For example, a single processor architecture (i.e., a single core system) may include an appropriate instruction that, when executed, will cause all caches of the system to be flushed.

Existing cache operation instructions have generally been developed for single core systems and are implemented to operate on a cache line basis or over an entire caching structure as a whole. Despite the introduction of multi-level cache structures, existing cache operation instructions such as those developed for x86 compatible processors do not provide fine-grained control over individual levels of a given cache hierarchy.

Moreover, existing cache operations are generally ill-suited to provide satisfactory performance in architectures using plural processors (i.e., dual core or multi-core systems). These various limitations are particularly troublesome in power-managed systems where any combination of the cores and the caches might be powered up or down at any given time.

For example, a multi-core system may employ multiple caches configured in a multi-level cache hierarchy. Some of the caches may be used exclusively by individual processors, while others may be shared by several or all of the processors. During operation, it may be advantageous to power down one core while allowing a second core to continue processing. Using existing cache operations, the entire cache hierarchy would be flushed when the first core is powered down, including those caches shared by the second core. As a result, the performance of the second core will likely suffer as the data contents of the entire shared cache must be re-established.

SUMMARY

In accordance with one embodiment of the invention, a microprocessor is adapted to interface with multiple caches configured in multiple cache levels. The microprocessor includes multiple processors associated with the caches. At least one of the processors is adapted to execute an instruction configured to identify a subset of the caches. The microprocessor also includes a control circuit adapted to perform an operation on the subset of the caches in response to an execution of the instruction by the at least one of the processors.

In accordance with another embodiment of the invention, a machine-implemented method is provided to manage multiple caches that are associated with multiple processors and are configured in multiple cache levels. The method includes selecting a subset of the caches. The method also includes preparing an instruction identifying the subset of the caches. The method further includes executing the instruction. In addition, the method includes operating on the subset of the caches in response to the instruction.

In accordance with another embodiment of the invention, a microprocessor includes means for processing instructions. The microprocessor also includes means for caching memory accesses. The microprocessor further includes means for identifying a subset of the caching means. In addition, the microprocessor includes means for operating on the subset of the caching means in response to the identifying means.

These and other features and advantages of the invention will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

Figure 1:
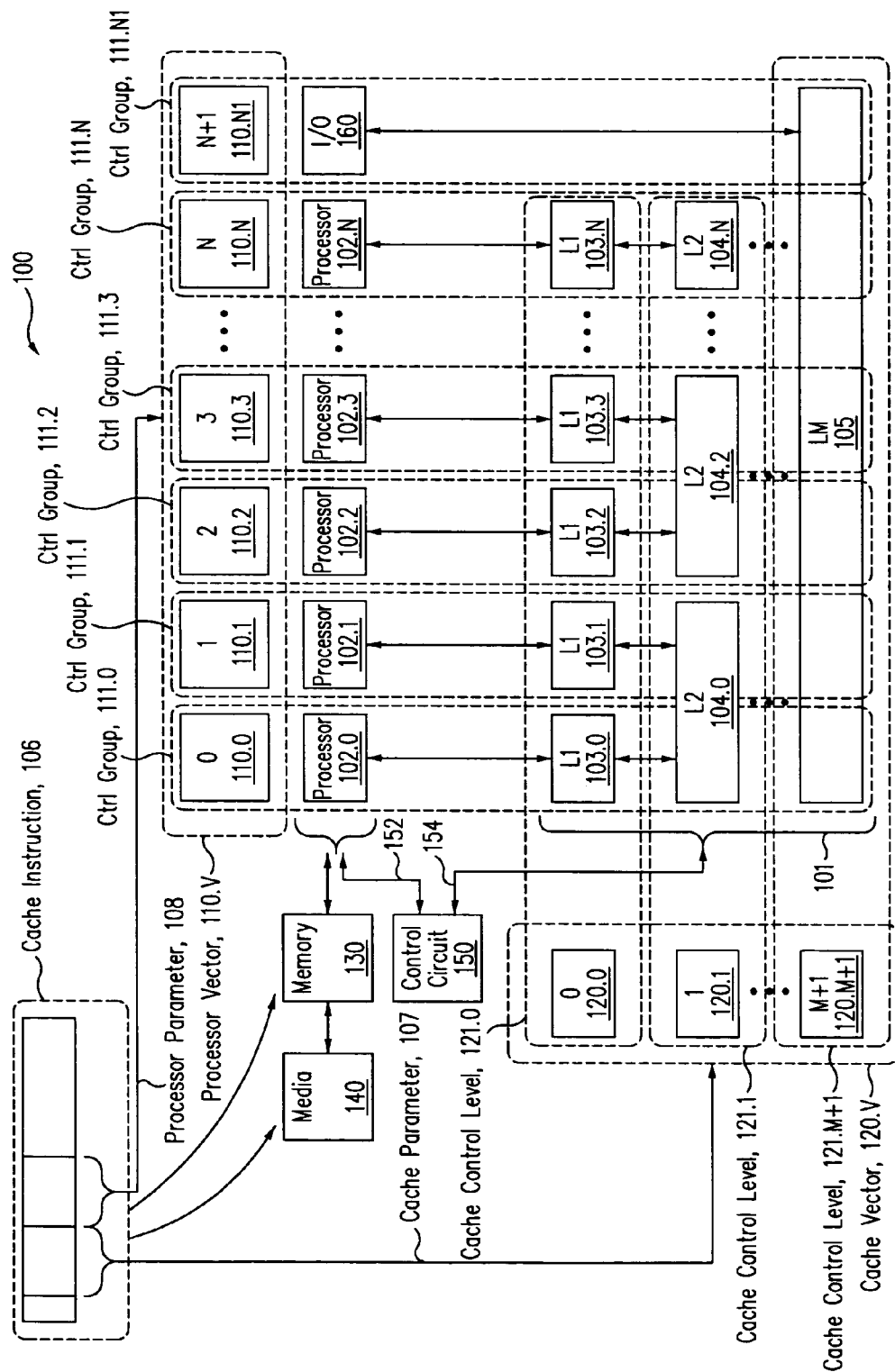
FIG. 1 is a block diagram illustrating a computer system having a multi-level cache hierarchy in accordance with an embodiment of the invention.

Referring now to the drawings wherein the showings are for purposes of illustrating embodiments of the invention only, and not for purposes of limiting the same, FIG. 1 is a block diagram illustrating a computer system 100 having a multi-level cache hierarchy in accordance with an embodiment of the invention. System 100 may be implemented to provide fine-grained control over individual caches of system 100. By using one or more appropriate cache instructions in accordance with various embodiments further described herein, shared and private caches may be efficiently operated in conjunction with power management operations of system 100. In various embodiments, some or all of the components of system 100 may be implemented in a microprocessor or used in conjunction with a microprocessor through appropriate interfaces.

As shown, system 100 includes multiple processors 102 (labeled 102.0 to 102.N). Processors 102 may be implemented, for example, as central processing units (CPUs), co-processors, combinations thereof, or other processor types. In certain embodiments, system 100 may be implemented as a multi-core system with two or more of processors 102 on a shared integrated circuit. System 100 may be further implemented to selectively operate individual processors 102 in different power states. For example, some of processors 102 may be operated in a low power (e.g., power saving) state while others are operated in a full power state. In one embodiment, processors 102 may be implemented as x86 compatible processors. System 100 also includes an input/output (I/O) subsystem 160 which may be used to interface system 100 with other components internal or external to system 100.

As illustrated, system 100 also includes multiple caches 101 configured in a multi-level cache hierarchy. Caches 101 may be configured in any desired number of cache control levels 121 (labeled 121.0 to 121.M+1). For example, M+1 cache control levels are provided in the embodiment of FIG. 1. In this regard, multiple first level caches 103 (labeled 103.0 to 103.N), multiple second level caches 104 (labeled 104.0 to 104.N), and an M-level cache 105 are associated with corresponding cache control levels 121.0, 121.1, and 121.M+1, respectively. It will be appreciated that additional cache control levels (e.g., third level, fourth level, etc.) may be implemented between second level caches 104 and M-level cache 105.

Each of caches 101 may be further associated with one or more of processors 102 and/or I/O subsystem 160 through appropriate interfaces of processors 102 and/or I/O subsystem 160. In the embodiment of FIG. 1, first level caches 103 are associated with individual processors 102. For example, cache 103.0 is associated with processor 102.0, and cache 103.1 is associated with processor 102.1. Second level caches 104 are shared by subsets of processors 102. For example, cache 104.0 is associated with both of processors 102.0 and 102.1. Similarly, cache 104.2 is associated with both of processors 102.2 and 102.3. M-level cache 105 is shared by all of processors 102 and I/O subsystem 160. In one embodiment, a first set of caches 101 may be implemented as part of one or more of processors 102, and a second set of caches 101 may be implemented apart from processors 102.

System 100 further includes memory 130 which may be associated with one or more of processors 102 and I/O subsystem 160. Machine-readable instructions (i.e., software) may be provided to system 100 on appropriate machine-readable media 140 from which the instructions may be read into memory 130 and used by processors 102. In this regard, it will be appreciated that memory 130 may be implemented as any appropriate memory for use by system 100 including, for example, volatile or non-volatile memory. Media 140 may be implemented as any appropriate media for use by system 100 including, for example, magnetic, optical, or other suitable machine-readable media.

System 100 may be implemented to support one or more cache instructions 106 that may cause system 100 to perform a desired operation on individual caches 101. For example, in various embodiments, the operation associated with a given cache instruction 106 may be a cache flush operation which may include, for example, a cache write-back-and-invalidate operation, a cache invalidate operation, a cache write-back operation, or other cache operation. It will be appreciated that cache instruction 106 may be included with other instructions embodied in media 140 and/or memory 130 to be executed by one or more of processors 102.

Cache instruction 106 may be implemented in various forms as may be appropriate for particular implementations. For example, it is contemplated that cache instruction 106 may be implemented as a unique instruction, multiple sub-instructions, an extended instruction (e.g., supplementing an existing instruction, such as an x86 INVD or WBINVD instruction, with prefixes or other fields), or other forms. As shown in FIG. 1, cache instruction 106 includes a cache parameter 107 and a processor parameter 108. Cache parameter 107 and processor parameter 108 may be implemented as individual fields of cache instruction 106, sub-instructions, prefixes, or other appropriate instruction formats.

Cache parameter 107 may be configured to correspond to multiple cache levels of caches 101. Cache parameter 107 may be implemented, for example, as a cache bit vector 120.V, wherein each bit of cache bit vector 120.V is associated with a corresponding one of cache control levels 121. For example, in the embodiment of FIG. 1, individual bits 120.0, 120.1, and 120.M+1 of cache bit vector 120.V are associated with corresponding cache control levels 121.0, 121.1, and 121.M+1, respectively.

Processor parameter 108 may be configured to correspond to all or a subset of processors 102 and/or I/O subsystem 160. Processor parameter 108 may be implemented, for example, as a processor bit vector 110.V, wherein each bit of processor bit vector 110.V is associated with a corresponding one of processors 102 or I/O subsystem 160 through multiple control groups 111. For example, in the embodiment of FIG. 1, individual bits 110.0, 110.1, 110.2, 110.3, 110.N, and 110.N1 of processor bit vector 110.V are associated with corresponding processors 102.0, 102.1, 102.2, 102.3, and 102.N, and I/O subsystem 160 through control groups 111.0, 111.1, 111.2, 111.3, 111.N, and 111.N, respectively. It will be appreciated that by associating I/O subsystem 160 with processor bit vector 110.V, caches 101 shared by I/O subsystem 160 (for example, M-level cache 105) may remain intact in the event that I/O subsystem operation is desired while all of processors 102 are powered down. In the event that I/O subsystem is also powered down, then all of caches 101 may be flushed.

As illustrated, each of caches 101 is associated with one or more of processors 102 through a corresponding one of control groups 111. In addition, each of caches 101 is associated with one of cache control levels 121. Accordingly, it will be appreciated that cache parameter 107 and processor parameter 108 taken together may identify a subset of caches 101. For example, if bit 120.0 of cache bit vector 120.V is set, and bit 110.0 of processor bit vector 110.V is set, then cache 103.0 may be identified as the subset. Similarly, if bit 120.1 of cache bit vector 120.V and bit 110.0 of processor bit vector 110.V are additionally set, then caches 103.1 and 104.0 may also be identified as part of the subset.

In another embodiment, cache instruction 106 may include only one of cache parameter 107 and processor parameter 108, with the other parameter being implicitly set to a predetermined logical value (for example, all 1's or all 0's). In yet another embodiment, only cache parameter 107 may be included, with the processor parameter 108 being implicitly set to a first predetermined logical value associated with the particular processor 102 executing the instruction, and a second predetermined logical value associated with the remaining processors 102. In a further embodiment, cache parameter 107 and processor parameter 108 may be provided in separate instructions.

A control circuit 150 may be provided to perform the cache operation specified by cache instruction 106 in response to an execution of the instruction by one or more of processors 102. Control circuit 150 may be implemented, for example, as part of a microprocessor with one or more of processors 102. Control circuit 150 may also be implemented as a processor-specific hardware state machine or micro-code that is activated by control signals 152 provided by the executing processor 102 which specify the desired cache operation (for example, a cache flush operation which may include a cache write-back-and-invalidate operation, a cache invalidate operation, a cache write-back operation, or other cache operation) as well as the subset of caches 101 to be operated on (for example, the subset of caches 101 identified by cache parameter 107 and processor parameter 108).

For example, in one embodiment, control circuit 150 may be implemented to flush or invalidate any one of caches 101 identified by cache parameter 107 and processor parameter 108. Write-back operations may write back the data to any further cache control level or backing store (e.g. memory 130). Invalidate and write-back operations may also provide upgrades (e.g., from shared caches to exclusive caches) to other caches 101 not identified by cache instruction 106.

In another embodiment, control circuit 150 may be implemented to operate on a given one of caches 101 only if all bits of processor bit vector 110.V corresponding to the cache's associated processors 102 or I/O subsystem 160 have been set. For example, control circuit 150 may be configured to operate on cache 104.0 only if cache control bit 120.1 and both of processor bits 110.0 and 110.1 have been set in cache parameter 107 and processor parameter 108 of cache instruction 106. In such an embodiment, control circuit 150 would not operate on cache 104.0 if processor bit 110.1 was not set. Advantageously, this implementation can prevent shared caches from being affected (e.g., flushed) by operations pertaining to only one of the processors 102 sharing the cache. However, it will be appreciated that alternative embodiments of control circuit 150 are also possible.

As previously discussed, processors 102 may be implemented to operate in different power states. In this regard, it may be advantageous to change the power state of a subset of processors 102 (e.g., from a high power state to a low power state, or vice versa) while maintaining other processors 102 in their existing power states. For example, when one of processors 102 is to be powered down, it may be desirable to perform an operation (e.g., a flush operation) on any of caches 101 that are used exclusively by the affected processor 102. However, it may be further desirable to refrain from operating on any of caches 101 that are shared by the affected processor 102 and any of other processors 102 or I/O subsystem 160.

Using various embodiments of cache instruction 106, system 100 may provide fine-grained control over desired subsets of caches 101 which may be used to facilitate power management of system 100. This can be further understood by way of an example provided by FIGS. 2 and 3.

Figure 2:
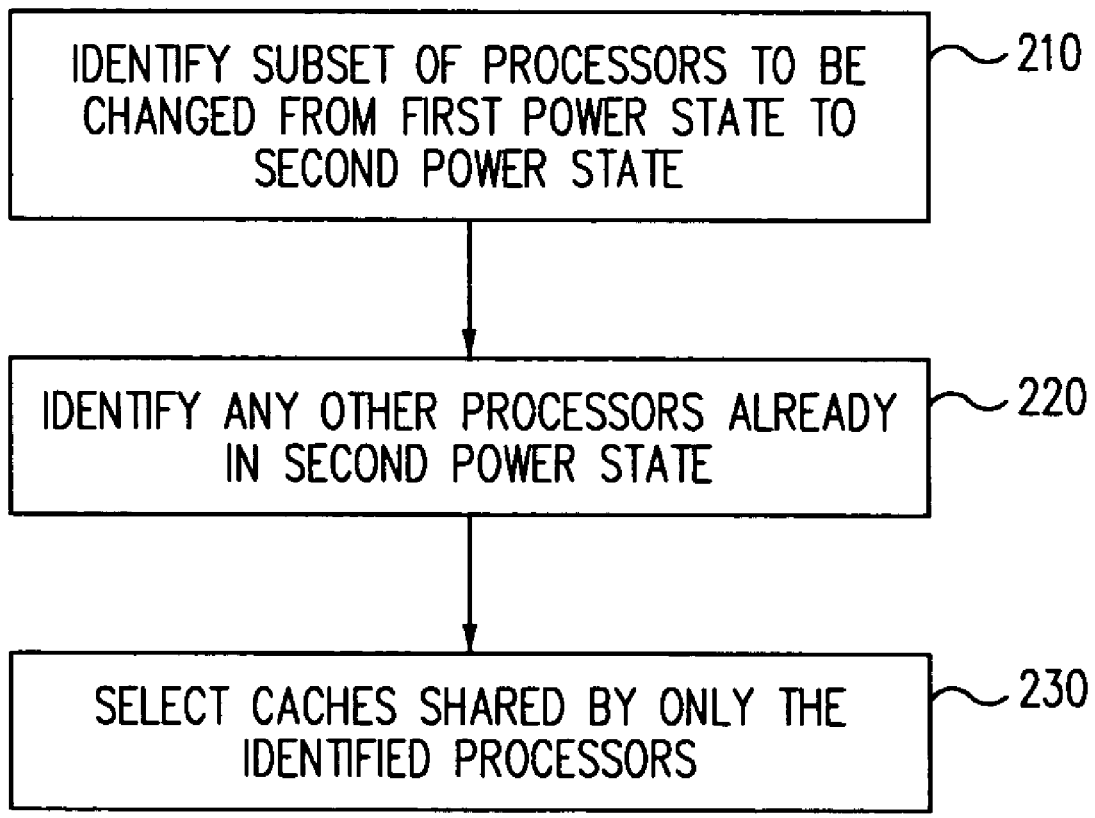
FIG. 2 is a flowchart illustrating a process of selecting a subset of caches in accordance with an embodiment of the invention.

FIG. 2 is a flowchart illustrating a process of selecting caches in accordance with an embodiment of the invention. In step 210, a subset of processors 102 to be changed from a first power state to a second power state is identified. For example, referring to FIG. 1, if processors 102.0, 102.1, and 102.2 are to be powered down, they may be identified as the subset of processors 102 in step 210. In this example, it is assumed that processor 102.3 was previously powered down, and that the remaining processors 102 are currently powered up.

In step 220, any other processors 102 already operating in the second power state are identified. Continuing the example above, processor 102.3 is assumed to have been previously powered down and therefore may be identified in step 220.

In step 230, any caches 101 that are shared by only the particular processors identified in steps 210 and 220 are selected. As shown in FIG. 1, caches 103.0, 103.1, and 103.2 are exclusively shared by processors 102.0, 102.1, and 102.2, respectively. In addition, cache 104.0 is shared by only processors 102.0 and 102.1. Accordingly, caches 103.0, 103.1, 103.2, and 104.0 will be selected in step 230. As also shown in FIG. 1, cache 104.2 is shared by processors 102.2 and 102.3. Because both of processors 102.2 and 102.3 were identified in previous steps 210 and 220 (i.e., processor 102.2 is being prepared to be powered down, and processor 102.3 was previously powered down), cache 104.2 will also be selected in step 230.

Accordingly, it will be appreciated that following the process of FIG. 2, a subset of caches 101 (i.e., including caches 103.0, 103.1, 103.2, 104.0, and 104.2 in this example) has been selected for operation in anticipation of powering down a subset of processors 102 (i.e., processors 102.0, 102.1, and 102.2 in this example).

In one embodiment, the above-identified steps 210 through 230 may be performed by executing appropriate software (for example, provided on media 140 and/or in memory 130). In another embodiment, steps 210 through 220 may be performed external to system 100 with the identification of the selected caches being provided to system 100 through, for example, media 140.

Figure 3:
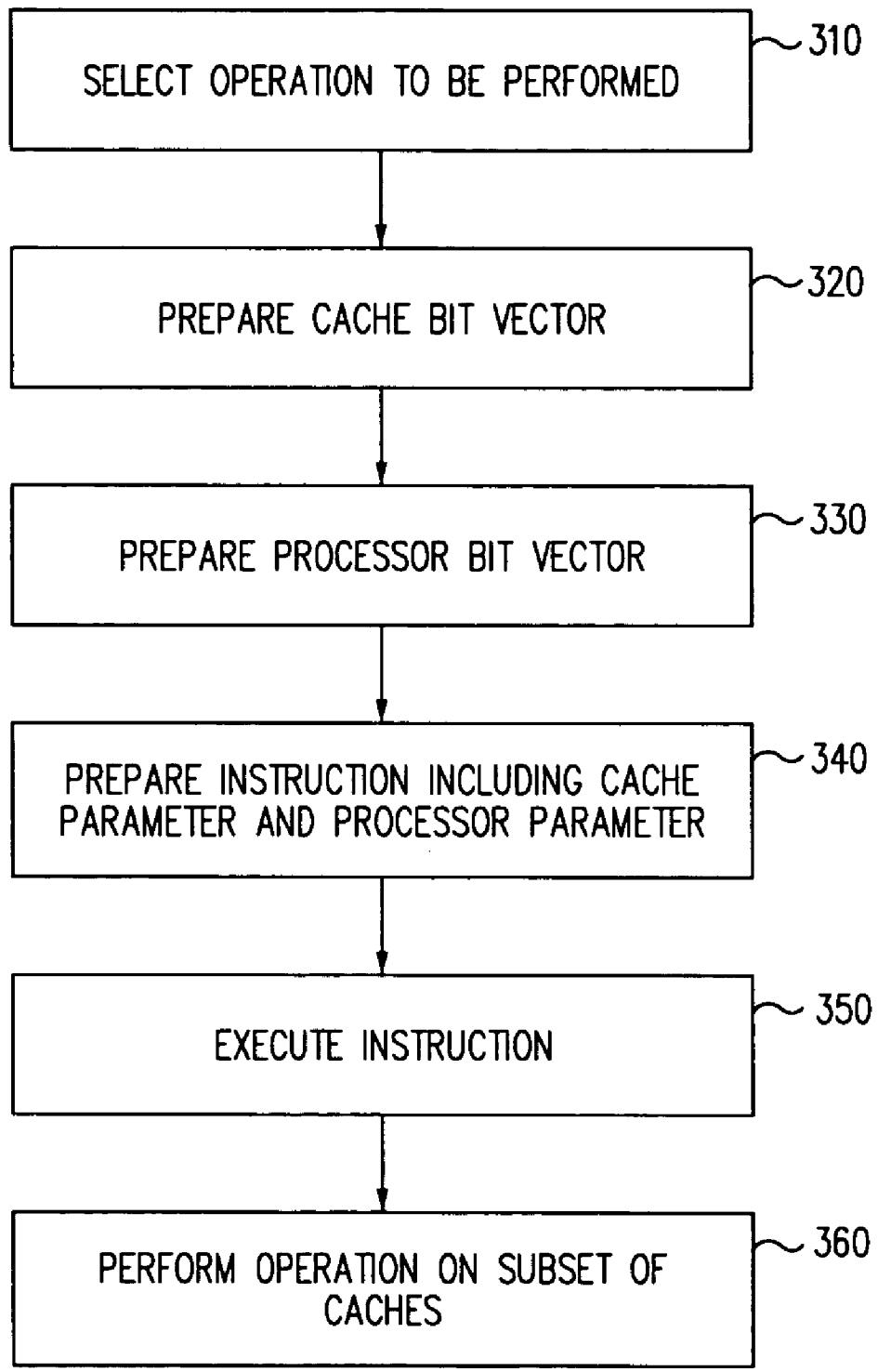
FIG. 3 is a flowchart illustrating a process of managing a cache hierarchy in accordance with an embodiment of the invention.

FIG. 3 is a flowchart illustrating a process of managing a cache hierarchy in accordance with an embodiment of the invention. It will be appreciated that the process of FIG. 3 may be performed following the process of FIG. 2.

In step 310, a desired cache operation is selected which will be performed on the subset of caches 101 previously selected in the process of FIG. 2. Continuing the example described above in FIG. 2, step 310 may include the selecting of a cache flush operation to be performed on caches 103.0, 103.1, 103.2, 104.0, and 104.2 in anticipation of powering down processors 102.0, 102.1, and 102.2.

In step 320, cache bit vector 120.V is prepared in order to identify particular cache control levels 121 corresponding to caches 101 in the selected subset of caches 101. In this example, bits 120.0 and 120.1 of cache bit vector 120.V may be set which correspond to caches 103.0, 103.1, and 103.2 at cache control level 121.0, and caches 104.0 and 104.2 at cache control level 120.1.

In step 330, processor bit vector 110.V is prepared in order to identify particular processors 102 corresponding to caches 101 in the selected subset. In this example, bits 110.0, 110.1, 110.2, and 110.3 of processor bit vector 110.V may be set which correspond to processors 102.0, 102.1, 102.2, and 102.3 previously identified during the process of FIG. 2.

In step 340, a cache instruction 106 is prepared corresponding to the operation selected in previous step 310. Cache instruction 106 includes cache parameter 107 corresponding to the cache bit vector 120.V prepared in step 320 and also includes processor cache parameter 108 corresponding to the processor bit vector 110.V prepared in step 330.

As similarly discussed with respect to FIG. 2, the above-identified steps 310 through 340 may be performed by executing appropriate software (for example, provided on media 140 and/or in memory 130). In another embodiment, steps 310 through 340 may be performed external to system 100 with cache instruction 106 being provided to system 100 for execution through, for example, media 140.

In step 350, one of processors 102 executes cache instruction 106 and provides control circuit 150 with appropriate control signals 152 in response thereto. For example, in one embodiment, control signals 152 may identify the selected subset of caches 101 as well as the cache operation to be performed.

In step 360, control circuit 150 operates on the subset of caches 101 in accordance with the operation associated with cache instruction 106. In this regard, control circuit 150 may provide appropriate control signals 154 to the selected subset of caches 101 to perform the operation. Continuing the example above, step 360 may include the flushing of caches 103.0, 103.1, 103.2, 104.0, and 104.2. Processors 102.0, 102.1, and 102.2 may subsequently be powered down.

Other embodiments are also contemplated. For example, it may be desirable in certain embodiments to allow the flushing of some shared caches 101 while not allowing the flushing of other shared caches 101 by changing the cache sharing associations between caches 101 and processors 102 and I/O subsystem 160. In another embodiment, system 100 may be configured to flush all of caches 101 and/or selectively flush caches 101 by cache control levels 121 (e.g., flushing a subset of caches 101 associated with a desired number of cache control levels 121 starting from the highest levels).

It will be appreciated that an improved approach to cache management in accordance with one or more of the various embodiments disclosed herein can provide desirable fine-grained control over individual caches 101 or subsets of a multi-level cache hierarchy. Advantageously, by using appropriate cache instructions, it is possible to avoid flushing an entire cache hierarchy when powering down one or more of processors 102 and/or I/O subsystem 160. By selectively operating on shared and unshared caches during power management processing, more efficient system operation can be achieved.

Cache operations can be managed on an individual cache basis without requiring knowledge of the actual organization cache hierarchy organization by callers of the cache instructions. If more knowledge is available, the cache bit vector 120.V can be used in conjunction with processor bit vector 110.V to prevent operation on particular caches.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing disclosure is not intended to limit the invention to the precise forms or particular fields of use disclosed. It is contemplated that various alternate embodiments and/or modifications to the invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the claims.

What is claimed is:

1. A microprocessor adapted to interface with a plurality of caches configured in a plurality of cache levels, the microprocessor comprising:
    a plurality of processors associated with the caches, wherein at least one of the processors is adapted to execute an instruction configured to identify a subset of the caches; and
    a control circuit adapted to perform an operation on the subset of the caches in response to an execution of the instruction by the at least one of the processors,
    wherein the instruction comprises a first parameter configured to correspond to the subset of the cache levels, wherein the first parameter is a cache bit vector, and wherein each bit of the cache bit vector is associated with a corresponding one of the cache levels.

2. The microprocessor of claim 1, wherein the control circuit is adapted to perform the operation in preparation for changing a power state of a subset of the processors.

3. The microprocessor of claim 1, wherein each cache of the subset of the caches is shared by a subset of the processors.

4. The microprocessor of claim 1, wherein the microprocessor is adapted to interface with an input/output (I/O) subsystem associated with the caches, wherein each cache of the subset of the caches is shared by the I/O subsystem.

5. The microprocessor of claim 1, wherein the operation is at least one of a cache write-back-and-invalidate operation, a cache invalidate operation, or a cache write-back operation.

6. The microprocessor of claim 1, wherein the caches comprise:
    a first set of caches implemented as part of the processors; and
    a second set of caches implemented apart from the processors.

7. The microprocessor of claim 1, wherein the processors are implemented on a single integrated circuit.

8. The microprocessor of claim 7, wherein the control circuit is implemented on the single integrated circuit.

9. The microprocessor of claim 1, wherein the control circuit comprises a state machine adapted to perform the operation.

10. The microprocessor of claim 1, wherein the control circuit comprises a microcontroller adapted to perform the operation.

11. The microprocessor of claim 1, wherein the control circuit is part of the at least one of the processors.

12. The microprocessor of claim 1, wherein the at least one of the processors is an x86 compatible processor.

13. The microprocessor of claim 1, wherein the parameter is a processor bit vector, wherein each bit of the processor bit vector is associated with a corresponding one of the processors.

14. The microprocessor of claim 1, wherein the parameter is a prefix of the instruction.

15. The microprocessor of claim 1, wherein the instruction further comprises:
    a second parameter configured to correspond to a subset of the processors, wherein the first parameter and the second parameter together correspond to the subset of the caches.

16. The microprocessor of claim 15, wherein the second parameter is a processor bit vector, wherein each bit of the processor bit vector is associated with a corresponding one of the processors.

17. The microprocessor of claim 15, wherein the first and second parameters are prefixes of the instruction.

18. The microprocessor of claim 1, wherein the instruction is an extended x86 instruction.

19. The microprocessor of claim 15, wherein the first parameter is a first sub-instruction and the second parameter is a second sub-instruction.

20. A machine-implemented method of managing a plurality of caches that are associated with a plurality of processors and are configured in a plurality of cache levels, the method comprising:
    selecting a subset of the caches;
    preparing an instruction identifying the subset of the caches;
    executing the instruction; and
    operating on the subset of the caches in response to the instruction,
    wherein the instruction comprises a first parameter configured to correspond to the subset of cache levels, wherein the first parameter is a cache bit vector, and wherein each bit of the cache bit vector is associated with a corresponding one of the cache level.

21. The method of claim 20, wherein the selecting further comprises:
    identifying a subset of the processors to be operated in a selected power state;

identifying any of the processors already operating in the selected power state; and selecting caches shared by only the identified processors.

22. The method of claim 20, wherein the subset of the caches is adapted to be accessed by a subset of the processors.

23. The method of claim 20, wherein the operating corresponds to at least one of a cache write-back-and-invalidate operation, a cache invalidate operation, or a cache write-back operation.

24. A microprocessor comprising:
means for processing instructions;
means for caching memory accesses comprising a plurality of cache levels;
means for identifying a subset of the caching means,
wherein the means for identifying a subset of the caching means comprises a first instruction parameter configured to correspond to a subset of the cache levels, wherein the first parameter is a cache bit vector, and wherein each bit of the cache bit vector is associated with a corresponding one of the cache levels; and
means for operating on the subset of the caching means in response to the identifying means.

25. The microprocessor of claim 24, further comprising means for changing a power state of a subset of the processing means, wherein the identifying means operates in response to the changing means.

26. The microprocessor of claim 24, wherein the identifying means further comprises:
means for identifying a first subset of the processing means to be operated in a selected power state;
means for identifying a second subset of the processing means already operating in the selected power state; and
means for identifying caches shared by only the first and second subsets of the processing means.

27. The microprocessor of claim 24, wherein the identifying means further comprises:
means for identifying a subset of the processing means.

28. A computer readable storage medium comprising a machine-readable instruction, wherein the machine-readable instruction is adapted to instruct a system to:
perform an operation on a subset of a plurality of caches associated with a plurality of processors, wherein the subset of the plurality of caches is configured in a plurality of cache levels of a cache hierarchy,
wherein the machine-readable instruction comprises a cache bit vector configured to correspond to the subset of the caches, wherein each bit of the cache bit vector is associated with a corresponding one of the cache levels of the cache hierarchy.

* * * * *